Figure 1:
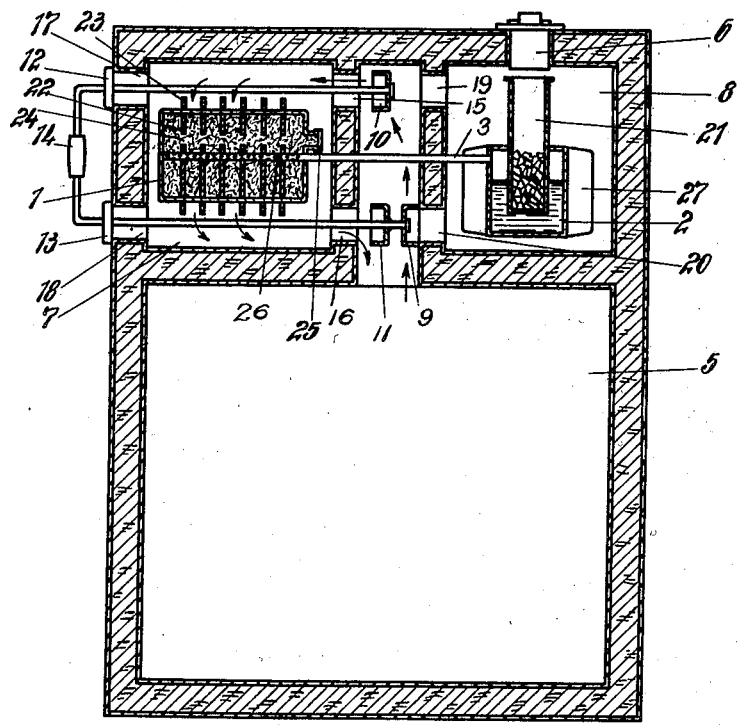

Jan. 14, 1936.    E. ALTENKIRCH ET AL    2,027,571
METHOD FOR THE TRANSFORMATION OF HEAT
Filed Oct. 17, 1932

INVENTORS
E. Altenkirch
K. Nesselmann
By Robb & Robb
Attorneys

Patented Jan. 14, 1936

2,027,571

UNITED STATES PATENT OFFICE 2,027,571

METHOD FOR THE TRANSFORMATION OF HEAT

Edmund Altenkirch, Neuenhagen, near Berlin, and Kurt Nesselmann, Berlin-Siemensstadt, Germany, assignors to Siemens-Schuckertwerke Aktiengesellschaft, Berlin-Siemensstadt, Germany, a corporation of Germany Application October 17, 1932, Serial No. 638,260
In Germany October 20, 1931

2 Claims. (Cl. 62—120)

Our invention relates to a method for the transformation of heat by means of an apparatus of the intermittent absorption type.

The main object of our invention is to provide a method for transforming heat from a lower to a higher temperature and vice versa by the use of an apparatus of the intermittent absorption type. According to the invention the vapor of the working medium is separated at a low pressure from the absorbing medium during the condensation period and condensed; whereupon the liquid working medium evaporates at a higher pressure during the absorption period and is again absorbed by the absorbing medium. In this manner, it is possible to use an apparatus of the intermittent absorption type for transforming heat of low temperature to heat of higher temperature in a particular way. This may be accomplished, for instance, either by producing from cold available at very low temperature a greater quantity of cooling of somewhat higher temperature or by producing heat of higher temperature from heat of lower temperature.

In the last-mentioned case, it is possible among other things to utilize the natural difference in temperature existing between a low outside temperature on the one hand and an average ground water temperature on the other hand for the production of heat. In this case the method is carried out in such a manner that the absorber-generator during the condensation period is supplied with heat of average temperature and the heat of condensation is abstracted from the condenser at a lower temperature; whereupon the evaporator during the absorption period is supplied with heat of average temperature and the heat is withdrawn from the absorber-generator at a higher temperature.

The first-mentioned case regarding the production of a greater quantity of cooling may, for instance, be applied to a refrigerating system operating with solid carbon dioxide. In this case, the heat is withdrawn during the condensation period from the condenser by means of a cooling medium (for instance carbon dioxide) and the absorber-generator is supplied with heat from the space to be cooled; whereupon during the absorption period the heat is taken up from the space to be cooled by the evaporator and the heat of absorption is carried off by the absorber-generator to the atmosphere.

In the accompanying drawing two embodiments for the method according to our invention are shown in diagrammatical form.

Figure 2:
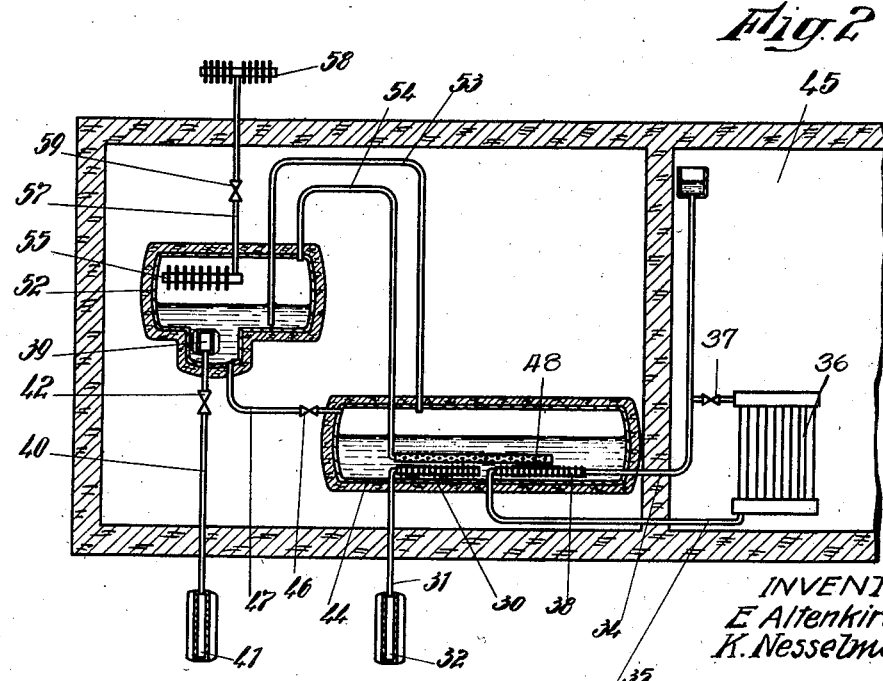

Fig. 1 illustrates a system in which the method for producing cold is utilized, and Fig. 2 shows a system in which the method corresponding to the invention is employed for the production of heat.

Referring to Fig. 1, 1 denotes the absorber-generator and 2 the corresponding condenser-evaporator of a refrigerating apparatus of the intermittent absorption type operating with solid absorbents. The absorber-generator is subdivided inside by means of heat-conducting walls 22 into individual cells into which a solid absorbent, for instance calcium chloride or strontium bromide, is introduced which forms with the refrigerant (for instance ammonia) a chemical compound. The heat conducting walls are provided with openings 24 which are coaxially arranged in relation to the filling opening 25. The solid absorbent is introduced into the filling opening 25 and falls through the openings 24, and is distributed over the single cells. Midway between the walls of the absorber-generator a perforated conduit 26 is arranged to which a conduit 3 is connected leading to the condenser-evaporator 2. On the outer wall of the absorber-generator 1 as well as on that of the condenser-evaporator 2 radiating ribs 23 and 27 respectively are arranged so as to assist both the application and the dissipation of heat. Both vessels 1 and 2 are placed each in a chamber 7 and 8 respectively which are heat-insulated with respect to the surrounding atmosphere as well as to the storage space 5 of the apparatus. The chamber 7 has four openings 15, 16, 17, 18 and the chamber 8 two, 19 and 20 controlled with exception of the opening 19 by valve-like members 9, 10, 11, 12 and 13 connected with one another and operated by a common handle 14, so that the chamber 7 may communicate on the one hand with the storage space 5 through the openings 15, 16 and on the other hand with outside air through the openings 17 and 18, and the chamber 8 may communicate with the storage space 5 through the openings 19 and 20. The reversal of the valve-like members may also be automatically effected; for instance, in accordance with the decrease in weight of the carbon dioxide snow or with the temperature of the evaporator. In the condenser-evaporator 2 a space 21 is provided for the reception of the carbon dioxide. The filling of this space is effected through a filling passage 6 arranged in the insulation; said passage may be provided with a cover to exclude the outside air.

The operation of the above-described apparatus is as follows: In putting the apparatus into operation, the carbon dioxide snow is introduced into the space 21 so that the condenser-evaporator 2 is intensely cooled down. In this manner the pressure prevailing in the apparatus is so low that the refrigerant is expelled in the absorber-generator 1 from the chemical compound. The refrigerant vapor is condensed in the condenser-evaporator 2 cooled by the carbon dioxide snow. During the condensation period, the valve system 9—13 is brought to the position as shown in Fig. 1. The lower opening 20 provided in the condenser chamber 8 is, consequently, closed by the valve member 9 in order to protect the condenser-evaporator from the higher temperature prevailing in the storage space 5. A valve member is not necessary for the opening 19, since a circulation of air and consequently a transfer of heat from the storage space 5 to the chamber 8 is prevented by the closure of the valve member 9. The evaporated carbon dioxide snow flows through the opening 19 and the refrigerator into the atmosphere, so that the waste cold of the carbon dioxide vapor is furthermore utilized for cooling the storage chamber. The absorption chamber 7 is closed against outside air during the condensation period by the valve-like members 12, 13, whereas the openings 15 and 16 communicate with the storage chamber 5, so that a circulation of air between the chamber 7 and the storage chamber 5 may take place so as to transfer the cooling from the absorption chamber 7 to the storage chamber 5.

At the end of the condensation period the valve system is reversed so that now the openings 15 and 16 of the chamber 7 are closed by the valve members 10 and 11, whereas the absorption chamber 7 communicates with outside air by the openings 17 and 18.

A communication between the condensation chamber 8 and the storage chamber 5 is also established at the same time by opening the valve member 9. The liquid refrigerant collected in the condenser 2 evaporates, and returns through the conduit 3 to the generator-absorber 1, where it is again absorbed. The condenser-evaporator 2 abstracts the heat of evaporation from the air in the chamber 8 which is thus cooled down. The cold air flows from the lower opening 20 of the chamber 8 to the storage chamber 5, whereas the hotter storage chamber air returns to the chamber 8 through the upper opening 19. This circulation causes the storage chamber to cool down. The heat of absorption is transferred from the absorber-generator to outside air. The air heated by the absorber-generator walls 22 and the cooling ribs 23 rises upwardly, and passes into the atmosphere through the opening 17, whereas the colder outside air flows into the lower part of the chamber 7 through the opening 18. To assists the air circulation, the openings 16 and 20 on the one hand and 19 and 15 on the other hand are not exactly disposed particularly one above the other, but are displaced. Further, to effect a proper circulation of air a perpendicular partition may be arranged.

This apparatus presents the following advantages: If the refrigerator should only be cooled by carbon dioxide snow, the cold energy stored up in the carbon dioxide snow would be utilized. However, by employing the above described method not only is the energy stored up by carbon dioxide utilized for the refrigeration, but also the cold energy stored up during the charging process of the absorption apparatus. In this manner the refrigeration effected by each kg. carbon dioxide snow is considerably enhanced, i. e., to about the double amount.

Fig. 2 shows a system in which the method according to the invention is utilized for the production of heat. In this case an apparatus of the intermittent absorption type is employed which operates with a liquid absorbent; for instance with an aqueous ammonia solution. 44 denotes the absorber-generator and 52 the corresponding condenser-evaporator of the absorption apparatus. 53 is a conduit for the expelled working medium and 54 a return conduit for the evaporated working medium. The return conduit 54 enters a perforated gas distributing conduit 48 at a point below the lowest liquid level in the absorber-generator 44. In this embodiment, the difference between the temperature of the outside air and that of the ground water is utilized for the production of heat of high temperature. In the upper part of the condenser-evaporator 52 an evaporator 55 of an indirect heat transfer system is disposed, the evaporator 55 being provided with radiating ribs. The corresponding condenser 58 radiates the heat to the atmosphere. Both parts 55 and 58 are connected by the transfer conduit 57 in which a check valve 59 is provided. In this closed system a liquid is placed which may transfer the cold prevailing outside to the condenser-evaporator 52 by condensation in the condenser 50 and by evaporation in the evaporator 55.

A similar heat-transfer system 30, 31 and 32 is arranged between the absorber-generator 44 and the ground water level. A further heat-transfer system 39, 40, 41 with a valve 42 disposed in the connecting conduit 40, connects the condenser-evaporator 52 with the ground water. A still further heat-transfer system is disposed between the absorber-generator 44 and the space 45 to be heated.

The system consists of the pipe 38 provided with cooling ribs and arranged in the absorber-generator 44, the ends of said pipe being connected through conduits 34, 35 to the radiator 36 arranged in the chamber 45. In the conduit 35 a regulating valve 37 is provided. The lowest point of the condenser-evaporator 52 is connected with the upper part of the absorber-generator by means of a drain conduit 47 in which a valve 46 is arranged. This valve must be opened at certain intervals in order to cause the absorbing medium entrained from the absorber-generator into the condenser-evaporator to flow back.

During the generating period the valves 42 and 37 are closed whereas the valve 59 is open. The absorber-generator is heated by ground water, whereas the condenser-evaporator is cooled by outside air. Consequently, the working medium is expelled from the absorber-generator and reaches through the conduit 53 the condenser-evaporator 52 where it is condensed. At the end of the generating period the valve 59 is closed and the valves 42 and 37 are brought to the open-position. As a result the heat is now transferred from the ground water to the condenser-evaporator so that the working medium evaporates in the latter and returns through the conduit 54 to the absorber-generator, where it is again absorbed. The heat of absorption is transferred from the absorber-generator 44 to the space 45 to be heated.

The greater the difference between the temperature of the ground water and the outside temperature, the greater the amount of working medium expelled during the generating period will be, and the greater the amount of heat developed during the heating period, and the higher the temperature, so that in the case of a lower outside temperature a higher temperature and also more heat is available for the space to be heated.

Instead of the heat existing in the ground water, any other waste heat sources may be utilized for heating the generator and the evaporator. In such cases also ground water may be used to advantage for cooling the condenser.

We claim as our invention:

1. In a system for the production of heat, an apparatus of the intermittent absorption type, comprising a generator-absorber and a condenser-evaporator, said condenser-evaporator being provided with two devices for the transfer of heat, one of said devices being so arranged as to give up the heat of condensation of the working medium to a medium of lower temperature, the other of said devices being so arranged as to transfer the heat from a medium of higher temperature to the condenser-evaporator, means in said two devices for controlling the transfer of heat, said generator-absorber being also provided with two devices for the transfer of heat, one of said devices of the generator-absorber being so arranged as to transfer during the period of condensation heat from a medium of lower temperature to the generator-absorber, and the other of said devices of the generator-absorber being so arranged as to transfer the heat of absorption to a medium to be heated.

2. In a system for the production of heat, an apparatus of the intermittent absorption type, comprising a generator-absorber and a condenser-evaporator, said condenser-evaporator being provided with two devices for the transfer of heat, one of said devices being so arranged as to give up the heat of condensation of the working medium to the cold outside air, the other of said devices being so arranged as to transfer the heat from the ground water to the condenser-evaporator for evaporating the work medium, said generator-absorber being also provided with two devices for the transfer of heat, one of said devices of the generator-absorber being so arranged as to supply during the period of condensation heat from the ground water to the generator-absorber, and the other of said devices of the generator-absorber being so arranged as to transfer the heat of absorption to a medium to be heated.

EDMUND ALTENKIRCH.
KURT NESSELMANN.